United States Patent [19]

Hoffman et al.

[11] 3,747,418
[45] July 24, 1973

[54] FLUIDIC INERTIAL PLATFORM

[75] Inventors: Jay Hoffman, Livingston; Raymond E. Weber, Jersey City; Constant J. DeCotiis, Cranford, all of N.J.

[73] Assignee: The Singer Company, New York, N.Y.

[22] Filed: June 8, 1971

[21] Appl. No.: 151,024

[52] U.S. Cl. .................................. 74/5.43, 74/5.6
[51] Int. Cl. ............................................. G01c 19/30
[58] Field of Search ............................ 74/5.43, 5.6; 33/204 M, 226 A

[56] References Cited
UNITED STATES PATENTS

| | | | |
|---|---|---|---|
| 3,498,145 | 3/1970 | Clark | 74/5.43 |
| 2,009,263 | 7/1935 | Henderson | 33/204 M |
| 2,293,707 | 8/1942 | Braddon | 74/5.43 |
| 3,610,053 | 10/1971 | Stripling et al. | 74/5.6 |

FOREIGN PATENTS OR APPLICATIONS

| | | | |
|---|---|---|---|
| 826,616 | 1/1938 | France | 74/5.43 |

Primary Examiner—Manuel A. Antonakas
Attorney—S. A. Giarratana and Thomas W. Kennedy

[57] ABSTRACT

An improved gyro stabilized inertial platform is provided which employs fluidic concepts in the entirety of its operation. The inertial platform to be described may serve as a mounting base for accelerometers, distance measuring devices, and the like. It may also provide angular read-out signals for pitch, roll and yaw of the vehicle in which it is installed. The fluidic controlled inertial platform of the invention operates at all attitudes, and it is particularly useful in aircraft, missiles and other space vehicles which are subject to abrupt flight maneuvers.

5 Claims, 6 Drawing Figures

INVENTORS:
Jay Hoffman
Raymond E. Weber
Constant J. DeCotiis

ATTORNEYS

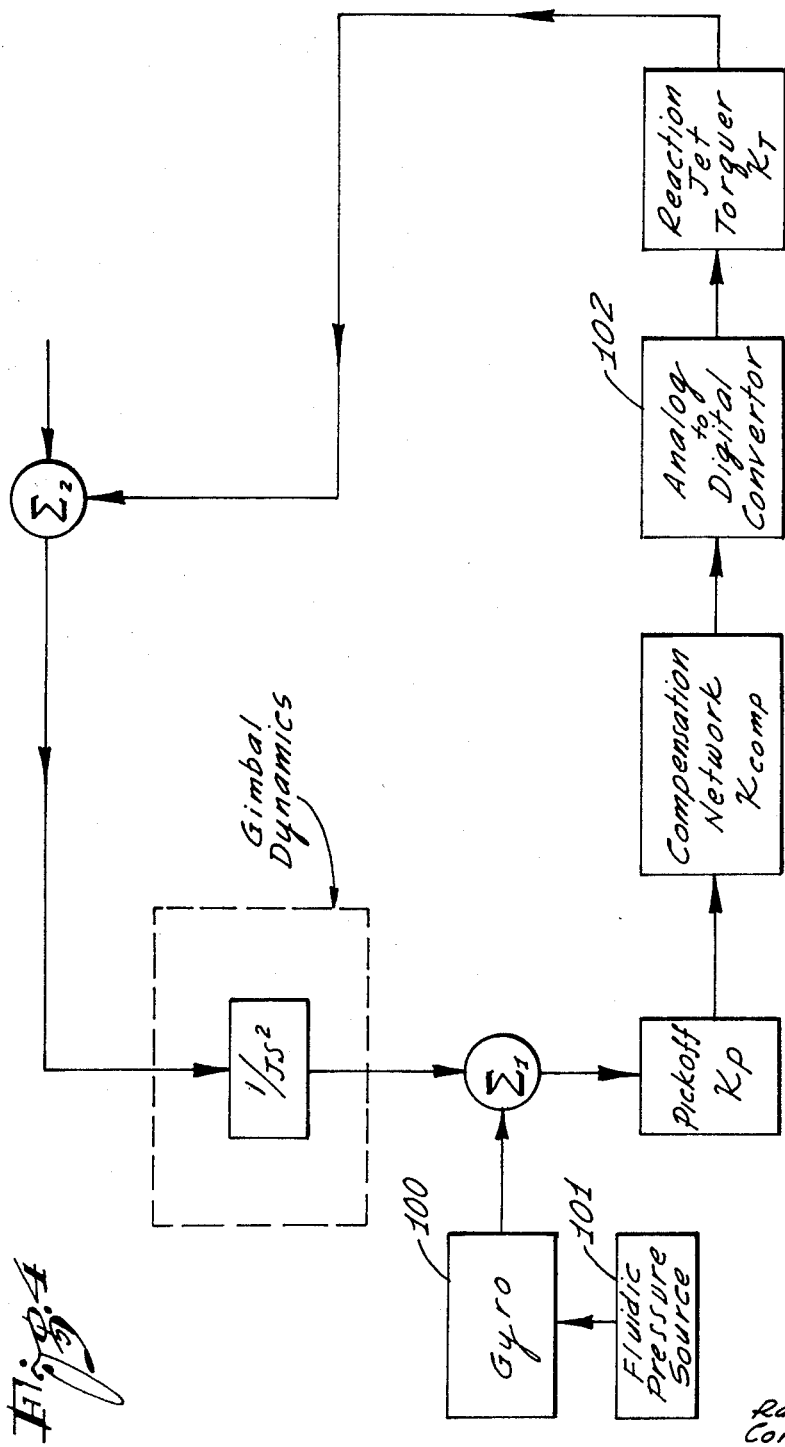

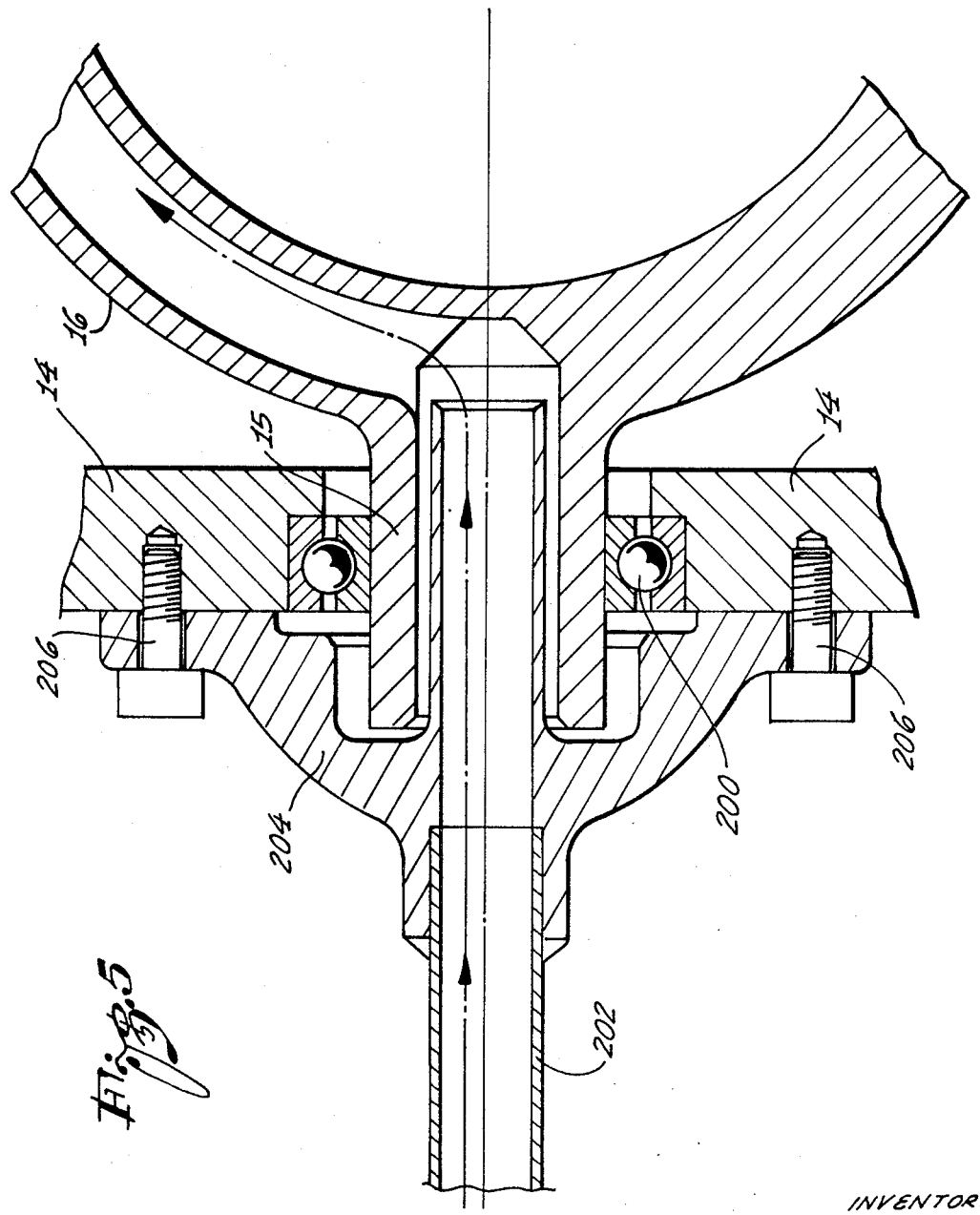

FLUIDIC INERTIAL PLATFORM

BACKGROUND OF THE INVENTION

Inertial platforms in space vehicles are well known to the art. The usual prior art inertial platform comprises a plurality of bodies respectively gimbaled about the roll, pitch and yaw axes of the vehicle, the individual bodies being controlled by electrically operated gyrosopic devices. As is well known, the usual prior art electrically controlled inertial platforms are expensive and fragile. They are also subject to damage and malfunction when exposed to nuclear radiations. In addition, the complexity of providing electrical transmission paths across the gimbals in the prior art devices not only results in a relatively high manufacturing cost, but causes the devices to be extremely susceptible to shock and vibration.

The inertial platform of the present invention is constructed, as mentioned above, so that the electric and solid state electronic mechanization of the usual prior art inertial platforms is replaced by fluidic controls. Inertial platforms constructed in accordance with the concepts of the invention are relatively inexpensive to manufacture, and they are relatively rugged, as compared with the prior art electronically controlled units. Moreover, the fluidic inertial platform of the present invention is not susceptible to damage or malfunction in a nuclear radiation environment, nor is it particularly sensitive to shock or vibration.

BRIEF DESCRIPTION OF THE DRAWINGS

FIG. 4 is a block diagram of a control system for the inertial platform of FIG. 1; and FIG. 5 is a section of a rotatable coupling, suitable for use in the system of FIG. 1, and providing a fluid transmission path into the system from an external source, if such a path is required.

DETAILED DESCRIPTION OF THE ILLUSTRATED EMBODIMENT

Figure 1:
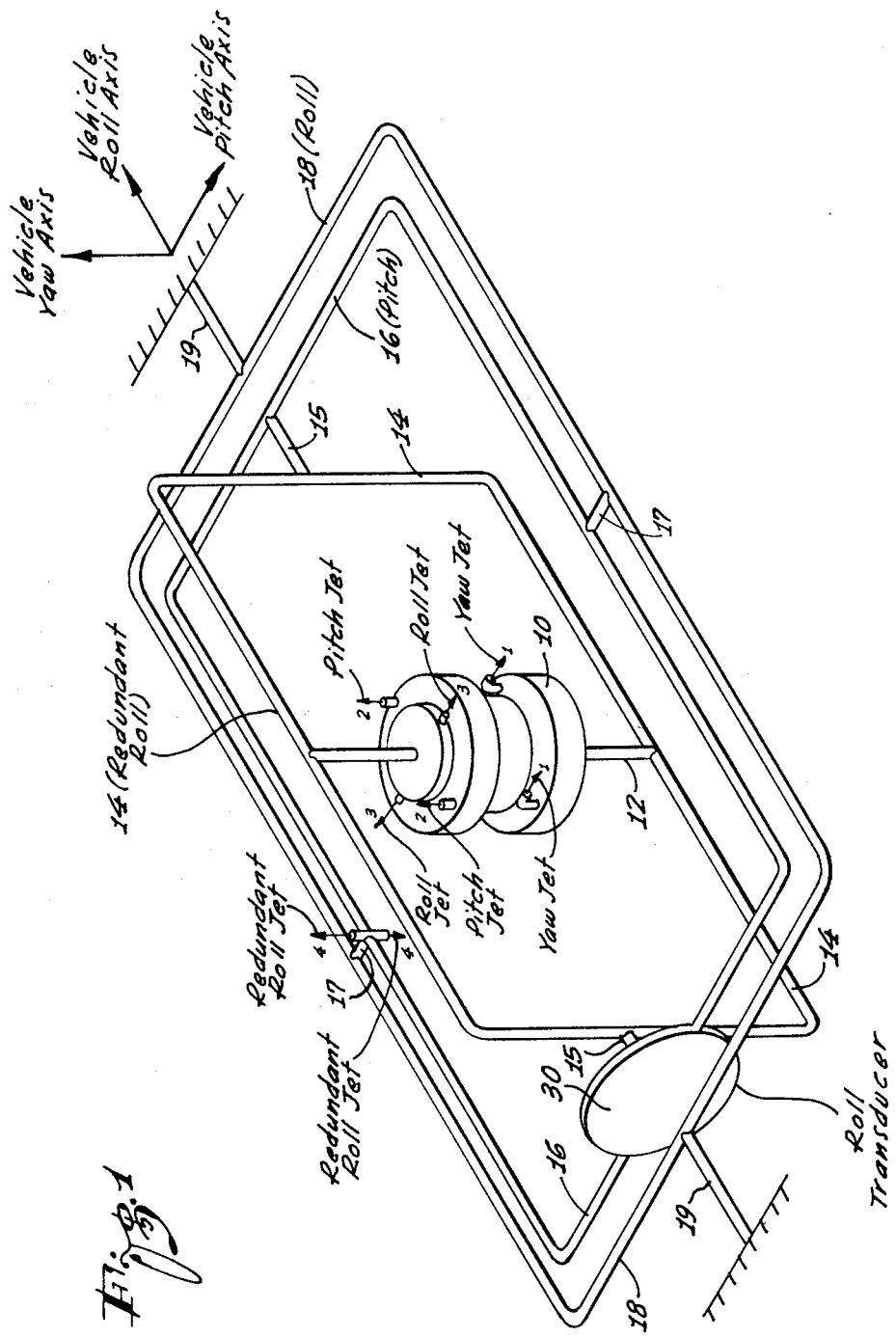
FIG. 1 is a perspective and somewhat schematic representation of a four-gimbal all-attitude fluidic platform constructed in accordance with the concepts of the present invention.
Figure 2:
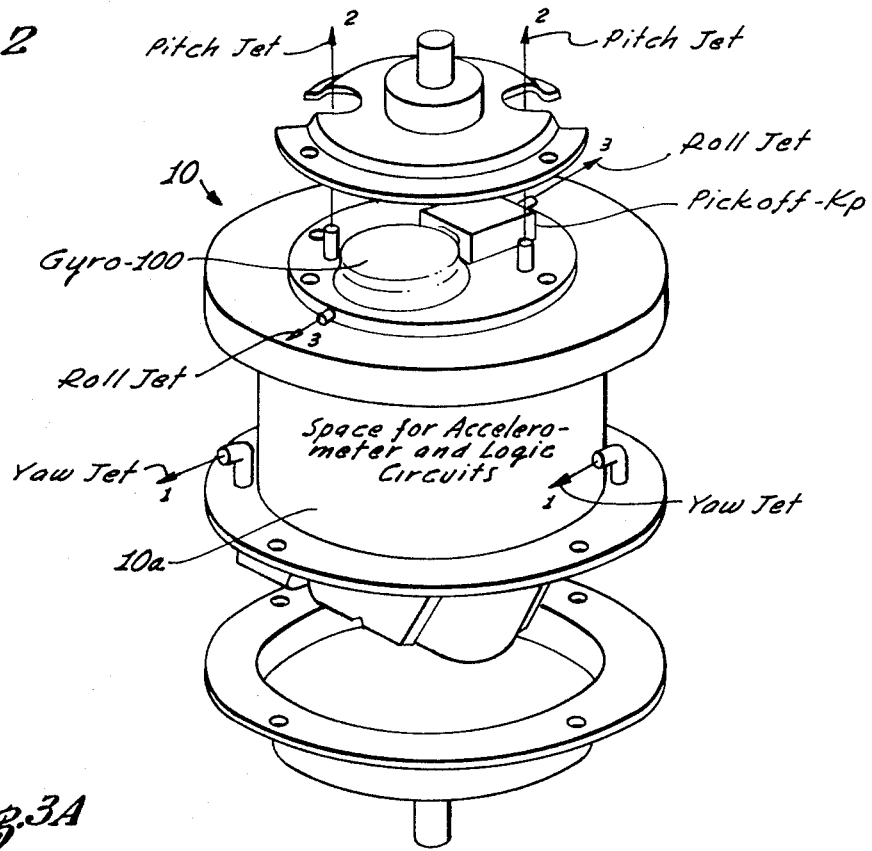
FIG. 2 is an exploded perspective representation of an innermost body incorporated into the inertial platform of FIG. 1 and supported for complete angular freedom relative to the vehicle in which the platform is installed.

The fluidic inertial platform of FIG. 1 includes a central body 10 which is described in somewhat more detail in FIG. 2. The central body 10 is rotatably supported on an elongated member 12 which extends along the yaw axis of the vehicle. The elongated member 12, in turn, is supported on a rectangular frame 14 which is designated the "redundant roll" body, and which is rotatably supported on the roll axis of the vehicle. The redundant roll body 14 is pivotally supported by end members 15 in a frame 16, which is designated the "pitch" body of the platform, and which is rotatably supported on the pitch axis of the vehicle.

The frame 16, in turn, is rotatably supported by end members 17 on an outer frame 18, which is designated the "roll" body of the platform, and the outer frame is rotatably mounted on the roll axis of the vehicle by elongated members 19. The various frames are rotatably coupled to one another by appropriate couplings. As shown in FIG. 1, a roll transducer 30 is supported in the frame 16, and details of the roll transducer are shown in more particularity in FIGS. 3A and 3B.

The basic construction of the fluidic inertial platform of the invention is shown in FIG. 1, in which the four-gimbal embodiment is illustrated. The inertial platform of FIG. 1 comprises four pivotally mounted bodies 10, 14, 16 and 18 which are so constrained as to permit the innermost body 10 to have complete angular freedom relative to the structure of the vehicle in which the assembly is installed. The redundant roll body 14 is included in the system to provide a capability at all attitudes.

The inner body 10 may comprise an assembly which includes all the fluidic gyroscopes, accelerometers, fluid logic circuitry and reaction jet torquers required for the operation of the system. The jet torquers are controlled by the fluid gyroscopes to produce fluid jets, as shown in FIG. 2, so as to stabilize the body 10 about the three orthogonal axes corresponding respectively to yaw, roll and pitch of the vehicle.

The stabilization of the body 10 is, in some aspects, similar to the attitude control of a space vehicle. In both cases, gyros are used to sense inertial attitude angles, and the gyros feed error signals to an attitude control system which develops torques to counteract angular disturbances. The restoring torques are then created by the control systems using reaction jets, such as shown in FIGS. 1 and 2. A gas gyro and pick-off system such as described in U.S. Pat. No. 3,416,378, is suitable for the purpose.

As shown in FIGS. 1 and 2, for example, any tendency for the member 10 to rotate about the yaw axis member 12 causes reaction jets 1 to occur which establish a counteracting and corrective torque. Likewise, any rotation of the member 10 about the pitch axis member 17 initiates the pitch jets 2 which, likewise, create corrective torques.

Finally, any tendency for the member 10 to rotate about the roll axis of the member 19 initiates roll jets 3 which, likewise, create the corrective torques. As mentioned above, accelerometers, logic circuits and other components may be mounted in the central portion 10a of the body 10, such as shown in FIG. 2. Since gyro controlled reaction jet systems are known to the art, as described in the aforesaid U.S. Pat. No. 3,416,378, it is believed unnecessary to incorporate details of such control systems, as they pertain to each of the three axes, in the description of the present invention.

Redundant gimbal stabilization is accomplished by means of the reaction jets 4 in FIG. 1, and under control of the roll transducer 30. The roll transducer 30 is controlled by the relative position of the redundant roll body 14 and the pitch body 16 in FIG. 1.

Figure 3A:
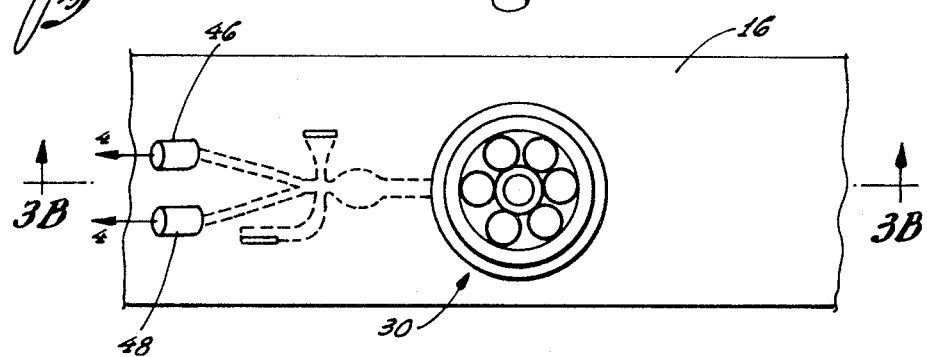
FIG. 3A is a plan view of a transducer which is incorporated into the platform of FIG. 1 and which, as will be described, controls a redundant gimbal stabilization in the system.
Figure 3B:
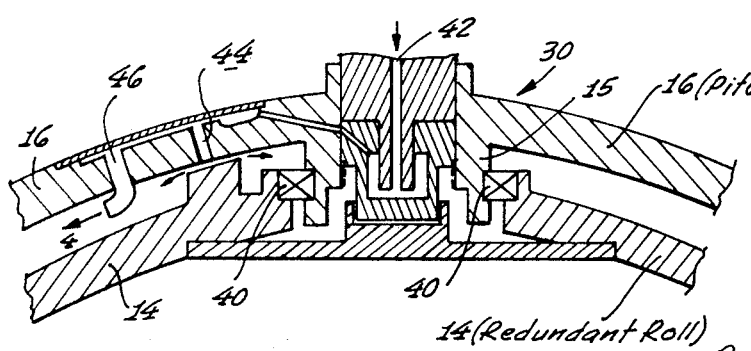
FIG. 3B is a section of the transducer taken along the line 3B—3B of FIG. 3A.

The roll transducer 30 is shown in more detail in FIGS. 3A and 3B. As shown, for example, in FIG. 3B, the body 16 is rotatably mounted by the member 15 in bearings 40 mounted on the body 14. As the redundant roll body 14 turns relative to the pitch body 16 in excess of a certain small limited angle, a first aspiration port 44 is uncovered venting a first leg 46, whereas when the relative angle between the redundant roll body and the pitch body exceeds a certain small limited angle in the other direction, a second aspiration port becomes opened venting a second leg 48 of the transducer. The arms 46 and 48 are respectively connected to the reaction jets 4—4 in the system of FIG. 1.

The transducer 30, is therefore, a fluidic bi-stable element which is switched from one state to the other by the selective aspiration from its legs 46 and 48 by the relative angular displacement of the redundant roll body 14 and pitch body 16. When either of the two aspirations ports is vented, the sudden drop in flow impedance along the corresponding legs 44 or 45 causes a gross aspiration to occur from the main flow channel of the bi-stable element, and this triggers a switching action causing the primary output flow of the fluid to change from one leg 46, 48 to the other. Since these legs are connected to each of the reaction jets 4—4 of FIG. 1, the resulting torque about the redundant roll axis changes direction each time the bi-stable fluidic element 30 is switched. The net effect is that of a "bang-bang" servo. The oscillatory amplitude of the servo is limited by viscous damping imposed through an appropriate damping ring coupling such as shown at the central portion in FIG. 3B.

A typical single channel stabilization loop is shown in the block diagram of FIG. 4. As mentioned above, the control system such as the control system shown in block form in FIG. 4 are known to the art, and are utilized in conjunction with gyros such as described in the aforesaid U.S. Pat. No. 3,416,478. Such a gyro is designated as 100 in FIG. 4. The angular output of the gyro is summed with the angular output derived from the gimbal dynamics system designated $1/JS^2$, and the two angular outputs are summed in a summing network $\Sigma_1$, any error signal resulting therefrom being introduced to a fluidic gyro pick-off designated $K_p$. The pick-off produces a gas flow level which is proportional to the angle sensed by the gyroscope 100. The resulting fluidic signal is processed in the pick-off $K_p$ through, for example, a stage of amplification, a stabilization network and a further stage of amplification. The resulting fluidic signal may be compensated in a known compensation network $K_{Comp}$, and the resulting fluidic signal is passed to an analog-to-digital converter 102.

The analog-to-digital converter is also a known type of fluidic converter, and it converts the fluidic signal from analog form to pulse duration modulated form. This conversion is desirable in order to achieve the power output required from the reaction jet torquers, as analog, or proportional, fluid amplifiers are inherently power limited.

The resulting pulse duration modulated fluidic signal is applied to a known type of reaction jet torquer $K_T$, so that particular body to its desired angular orientation, as designated schematically by the summing network $\Sigma_2$. Since bi-stable fluid amplifiers can provide adequate power for the system, the reaction jet torquer $K_T$ may incorporate that type of amplifier, and the aforesaid pulse duration modulated signal form is completely compatible with the bi-stable fluid amplifier logic. It will be understood that a system such as the system shown in block form in FIG. 4 may be used to control each individual body in the overall system of FIG. 1.

Power for the system may be derived from pressurized gas, such as dry air, nitrogen or helium, for example. This gas may be provided by a compressor, or by a hydrostatically stored source. The source of pressurized gas may be mounted on the central body 10, at which case, there is no need for a gas transmission path through the rotatable joints of the gimbal system. However, the pressurized gas may be stored at a remote location, for which case fluidic slip rings may be used, such as shown in FIG. 5 to transmit the gas through the gimbal system.

In the particular coupling of FIG. 5, for example, the body 16 is shown as having its elongated member 15 rotatably mounted in the body 14 in bearings 200. A gas inlet line 202 is supported in coaxial relationship with the member 15, the line 202 being supported in a bracket 204 which, in turn, is mounted on the body 14 by screws 206. The bracket 204 has a hollow re-entrant interior section which extends into the hollow interior of the elongated member 15, as shown, in coaxial relationship therewith, and which communicates with the hollow interior of the body 16, as shown. The bracket 204 provides a seal so that fluid may flow unimpeded from the inlet line 202 to the interior of the body 16 upon relative rotation of the bodies 14 and 16. With such an assembly, the leakage of the fluid is minimized since the bracket 204 provides a high impedance leakage path for the fluid as it is introduced into the interior of the body 16.

The invention provides, therefore, an improved rugged inertial platform which is fluidic in nature, and which has the advantages of ruggedness and reliability, as well as being low in cost. The inertial platform of the invention may be constructed to operate at all attitudes. The assembly also has the advantage of being immune to nuclear radiation.

It will be appreciated that while a particular embodiment of the invention has been shown and described, modifications may be made. It is intended in the following claims to cover all modifications which fall within the scope of the invention.

What is claimed is:

1. In combination:
   a central body member;
   gimbal support means for said central body member for mounting said body member in a vehicle and permitting free angular movement of said central body member about three orthogonal axes;
   reaction jet torquing means mounted on said central body member for establishing reaction torques about each of said three orthogonal axes; and
   fluidic gyroscopic means mounted on said central body member for individually controlling said jet torquing means so as to maintain a constant attitude for said central body member in the presence of variations in the attitude of said vehicle, in which said gimbal support means includes an outer gimbal member pivotally mounted for rotation about one of said orthogonal axes and an inner gimbal member pivotally mounted to said outer gimbal member for rotation about a second of said orthogonal axes, and in which said central body member is supported on said inner gimbal member for rotation about a third of said orthogonal axes, and in which said fluidic gyroscopic means includes at least one two-axis free-rotor gyro, said gyro comprising a rotor and a stator and a gas drive means and gas pickoff means and a gas supply means.

2. In combination:

a central body member;

gimbal support means for said central body member for mounting said body member in a vehicle and permitting free angular movement of said central body member about three orthogonal axes;

reaction jet torquing means mounted on said central body member for establishing reaction torques about each of said three orthogonal axes, and fluidic gyroscopic means mounted on said central body member for individually controlling said jet torquing means so as to maintain a constant attitude for said central body member in the presence of variations in the attitude of said vehicle, in which said gimbal support means includes an outer gimbal member pivotally mounted for rotation about one of said orthogonal axes and an inner gimbal member pivotally mounted to said outer gimbal member for rotation about a second of said orthogonal axes, and in which said central body member is supported on said inner gimbal member for rotation about a third of said orthogonal axes, and which includes fluidic slip ring means intercoupling said outer gimbal to said inner gimbal and defining a fluidic path from an external fluidic pressure source to said central body member.

3. In combination:

a central body member;

gimbal support means for said central body member for mounting said body member in a vehicle and permitting free angular movement of said central body member about three orthogonal axes;

reaction jet torquing means mounted on said central body member for establishing reaction torques about each of said three orthogonal axes; and fluidic gyroscopic means mounted on said central body member for individually controlling said jet torquing means so as to maintain a constant attitude for said central body member in the presence of variations in the attitude of said vehicle, in which said gimbal support means includes an outer gimbal member pivotal mounted for rotation about one of said orthogonal axes and an inner gimbal member pivotally mounted to said outer gimbal member for rotation about a second of said orthogonal axes, and in which said central body member is supported on said inner gimbal member for rotation about a third of said orthogonal axes, and which includes a transducer unit mounted on said outer gimbal member and actuated by said inner gimbal member for sensing angular displacement between said inner and outer gimbal members in excess of a predetermined angle, and further reaction jet torquing means coupled to said transducer for establishing reaction torques in one direction or the other about one of the aforesaid orthogonal axes whenever said predetermined angular displacement is exceeded.

4. The combination defined in claim 3, and which includes a further gimbal member mechanically coupled to said outer gimbal member and supported for rotation about one of the aforesaid orthogonal axes, and in which said further reaction jet torquing means produces rotation of said further gimbal member about said last-mentioned axis in one direction or the other.

5. The combination defined in claim 3, in which said transducer includes first and second arms coupled to said further jet torquing means to introduce reaction pressure fluid jets thereto, and in which said transducer includes structure defining first and second aspiration ports for selectively venting the aforesaid arms whenever the aforesaid angular displacement exceeds the aforesaid minimum.

* * * * *